United States Patent [19]

Schiebelhuth

[11] Patent Number: 5,283,854
[45] Date of Patent: Feb. 1, 1994

[54] CONTINUOUS FLOW HEATER CONTROL SYSTEM FOR AN APPARATUS FOR MAKING INFUSION BEVERAGES

[75] Inventor: Heinz Schiebelhuth, Frankfurt am Main, Fed. Rep. of Germany

[73] Assignee: Braun Aktiengesellschaft, Frankfurt, Fed. Rep. of Germany

[21] Appl. No.: 880,184

[22] Filed: May 7, 1992

[30] Foreign Application Priority Data

May 22, 1991 [DE] Fed. Rep. of Germany ....... 4116618

[51] Int. Cl.[5] .................... H05B 1/02; A47J 31/057; A47J 31/56; F24H 1/14
[52] U.S. Cl. .................................. 392/467; 99/281; 99/285; 99/288; 99/307; 219/432; 392/480
[58] Field of Search ............... 392/467, 480; 219/432, 219/433; 99/279-281, 282, 285, 288, 307

[56] References Cited

U.S. PATENT DOCUMENTS

| 4,758,709 | 7/1988 | Schiebelhuth et al. |
| 4,762,055 | 8/1988 | Shimomura ...................... 99/280 X |
| 4,772,777 | 9/1988 | Weller et al. |
| 4,838,152 | 6/1989 | Kubicko et al. ...................... 99/280 |
| 4,904,845 | 2/1990 | Wonka . |
| 4,994,641 | 2/1991 | Schiebelhuth . |

FOREIGN PATENT DOCUMENTS

| 199768 | 9/1958 | Austria . |
| 2431538 | 1/1976 | Fed. Rep. of Germany ........ 99/279 |
| 3229653 | 8/1983 | Fed. Rep. of Germany . |
| 3427948 | 7/1984 | Fed. Rep. of Germany . |
| 8701916.7 | 2/1987 | Fed. Rep. of Germany . |
| 2228634 | 8/1990 | United Kingdom . |

Primary Examiner—Anthony Bartis
Attorney, Agent, or Firm—Fish & Richardson

[57] ABSTRACT

An electrically heated continuous flow heater control system includes an electric switching element that has an open and a closed switching position and is electrically connected in series to a thermostat. Switching element (26) is always closed in the brewing process while it can be opened and closed again in the keep-warm process by a control circuit. The control circuit includes a temperature sensor which is in good heat contact with the infusion beverage. When in the initial phase of the keep-warm process the sensor temperature is in excess of a definable switching temperature, the control circuit keeps the switching element in its open position for as long as the sensor temperature remains higher than the switching temperature in the course of the consequently occurring cooling of the infusion beverage. When the sensor temperature is below or equal to the temperature of the switching element in the keep-warm process, the control circuit keeps the switching element in its closed position for a predefinable first time interval (heating cycle) irrespective of the sensor temperatures produced during the heating cycle.

15 Claims, 4 Drawing Sheets

CONTINUOUS FLOW HEATER CONTROL SYSTEM FOR AN APPARATUS FOR MAKING INFUSION BEVERAGES

The present invention relates to a continuous flow heater.

BACKGROUND OF THE INVENTION

Continuous flow heaters of this type are known from DE-33 39 653 A1, for instance. The second function performed by the known continuous flow heaters apart from producing and supplying hot water to the brewing unit, namely to keep the infusion beverage controlledly warm by means of a warming plate upon completion of the brewing process, has been the subject matter of a number of protective right applications. The basic problem of the controlled keep-warm process resides in that the quantity of heat, which may amount to some 10 watts only and which is meant to compensate for the losses of heat from which the infusion beverage in the storage tank suffers, is desired to be produced by the continuous flow heater as well. However, the continuous flow heater has a relatively great heating capacity which is desirable for the brewing process and may amount to more than 1000 watts.

In order on a time average to produce a comparatively so small heating-power in a continuous flow heater of this type, the principle of the controlled keep-warm process resides in that the continuous flow heater is set to operate for a relatively short time and, subsequently, is deactivated again for a relatively long time. To this end, the continuous flow heater is switched on and off, respectively, in a known fashion by a thermostat thermally coupled to it in such a manner that, once the thermostat reaches its opening temperature, it will interrupt the voltage supply to the continuous flow heater and will reconnect it again after having cooled down to its closing temperature.

The result is that a relatively large quantity of heat is conveyed in a relatively short time to the infusion beverage from the warming plate through the bottom of the storage tank, what in turn has as a result that layers of the infusion beverage resting on the bottom of the storage tank will be heated remarkably, therefore rise upwardly in the storage tank, while cooled layers drop in the direction of the bottom of the storage tank. This causes a cycle within the storage tank due to convection so that, as a result, the entire infusion beverage can be kept warm approximately at the average temperature desired. However, this constantly performing cycle of heating and subsequent cooling has adverse effects on the flavour of the infusion beverage, in particular when the beverage is coffee.

Various proposals have been made already to minimize the adverse effects on the coffee's flavour when the coffee is kept warm in a controlled way.

Thus, it has been suggested already for keeping warm small quantities of coffee to provide apart from the thermostat available already a second thermostat with a lower opening temperature which by means of a so-termed 'small-quantity switch' can be connected into the circuit for the heating element of the continuous flow heater, whereby the heating power delivered by the continuous flow heater on a time average is reduced (see DE-87 01 916 U1). However, in doing so, the heating power of the continuous flow heater is reduced also in the brewing process, from what ensues that the duration of the brewing process is prolonged without there being accomplished any appreciable favourable effects on the flavour of the infusion beverage.

Another solution intended again for keeping warm small quantities of coffee resides in starting an auxiliary heating to operate by actuating the small-quantity switch. This auxiliary heating will then heat the sole temperature controller provided when said is in its open position, the result being that the period of time is extended after which the temperature controller will return to its closing position again, so that in this case, too, the quantity of heat delivered to the warming plate on a time average is reduced (see EP-0 186 097 A1).

For the activation of the corresponding switching means to keep warm small quantities of infusion beverages, both the continuous flow heaters described in DE-87 01 916 U1 and in EP-0 186 097 A1 beside the main switch require to still actuate the small-quantity switch, without the actuation of which the infusion beverage will be subjected to relatively wide temperature variations in the keep-warm process. That is to say, in case of need the user has to actuate two switching means, what will be forgotten from time to time, on the one hand, and what is detrimental to the operating comfort, on the other hand.

DE 35 35 687 A1 discloses an apparatus which is intended not only to controlledly keep warm small quantities of an infusion beverage. In the continuous flow heater described therein, the heat connection to the warming plate is influenced in a mechanical fashion in that, by way of a bimetallic element, the distance between continuous flow heater and warming plate is adjusted such that it is larger when the continuous flow heater is very hot than it is when the continuous flow heater is less hot. As a result, the quantity of heat issued by the continuous flow heater to the warming plate will be rendered steady, that means the maxima of the issued heating power are dropped and the minima are raised.

A disadvantage common to all aforementioned measures of minimizing the adverse effects on the flavour of the infusion beverage resides in that, as a criterion for the control of the continuous flow heater, the temperature of the thermostat thermally coupled thereto is used, of which it is assumed that it rather correctly reflects the actual temperature conditions within the infusion beverage contained in the storage tank. Moreover, all of the described thermostats have a relatively great hysteresis, that means their opening temperature at which they interrupt the power supply of the electric heating element of the continuous flow heater may well be 10 or more degrees Celsius in excess of their closing temperature, at which they reconnect the electric heating element with the power supply. Likewise this feature of the used thermostats contributes considerably to the described irregularity of the quantities of heat issued per time unit by the continuous flow heater in the keep-warm process to the warming plate.

SUMMARY OF THE INVENTION

Therefore, it is the object of the present invention to improve upon a continuous flow heater such that it issues the full heating power in the brewing process, on the one hand, while, on the other hand, it is controlled in the keep-warm process such that the temperature variations of the warming plate and hence those of the infusion beverage will be kept as small as possible.

The provision of a switching element actuated by a control circuit, on the one hand, and of a temperature sensor which is in good heat contact with the infusion beverage, on the other hand, serves to accomplish that the temperature of the infusion beverage is directly taken into account for controlling its keep-warm process and is not only derived from the temperature of the thermostat—as is known from the state of the art. Two accomplishments result from the inventive control principle realised by the control circuit. First of all, the effect is eliminated which is caused by the thermostat and is referred to as hysteresis hereinabove, since the duration of the heating cycles is rated to be so short that the thermostat remains always closed, on the one hand. On the other hand, the temperature sensor itself in connection with the inventive control principle realised by the control circuit does not cause any hysteresis effect at all. That means that a so-called heating cycle will be performed in the presence of sensor temperatures inferior to or equal to a predefinable switching temperature, while the electric switching element is maintained open by the control circuit at sensor temperatures in excess of the switching temperature. Further, the heat supply to the warming plate is rendered considerably steadier by the relatively short heating cycles which repeatedly take place in the keep-warm process. Provided that the marginal condition applies at the commencement of the keep-warm process that the sensor temperature is in excess of the switching temperature, according to the present invention the switching element is maintained open until the sensor temperature drops to the switching temperature before the first heating cycle is started. It is safeguarded this way that right at the beginning of the keep-warm process an 'excessive' rise of the temperature of the infusion beverage, is prevented, which is sufficiently hot anyway when the keep-warm process begins, as it has been the case with the prior-art continuous flow heaters.

After a heating cycle has been performed in the continuous flow heater according to the present invention, the switching element is kept open by the control circuit for a defined dead time irrespective of the actual sensor temperature, whereupon after said has elapsed either another heating cycle is performed or the switching element is further maintained open by the control circuit depending on the sensor temperature. This measure is particularly favourable in continuous flow heaters having a great heating power, since the dead time prevents the infusion beverage heating up again too fast when the beverage has an appreciably too low temperature. This will occur, for instance, when upon completion of the infusion beverage the storage tank has not been placed on a warming plate for a longer time, but e.g. will have been standing on a table for serving the beverage.

The improvement upon the inventive continuous flow heater is advantageous inasfar as the end of the brewing process is fixed by the thermostat itself which, anyway, must be provided for a continuous flow heater of this type for reasons of safety. Once a value of 40 seconds is chosen for determinable second length of time in which the thermostat has adopted its open condition for the first time after the service start of the continuous flow heater, it can be reliably assumed that the brewing process is completed and the transition to the keep-warm process of the continuous Flow heater is about to happen. This is because such long opening times will not occur on the thermostat in the brewing process, not even if the water pipe of the continuous flow heater is calcified to a major extent, since the water contained therein will bring about relatively quickly that the thermostat cools off again to its closing temperature.

The improvement upon the inventive continuous flow heater affords the advantage that, in turn, the switching functions of the thermostat, which is required anyway for safety reasons, serve to draw conclusions in respect of the growing calcification of the water pipe, and it has shown in practice that by selecting values of 10 to 20 seconds for a third determinable length of time the beginning calcification of the water pipe is indicated neither too late nor too early. This way the control circuit which is provided anyway for the control of the continuous flow heater in the keep-warm process will permit also to detect and indicate the occurrence of calcification of the water pipe.

In a particular embodiment, affords the advantage that the user of the infusion beverage maker can adjust the switching temperature and thus also the temperature of the infusion beverage which is to be kept warm. It has shown that already the close temperature range between 65° and 85° Celsius satisfies all requirements to be met in practice.

When, at a heating power of the continuous flow heater of roughly 1000 watts, values are chosen for the opening and closing temperature of the thermostat and for the length of the dead time, good results will be obtained in practical operation with a duration of a heating cycle of 10 seconds in respect of the keeping warm and the preservation of flavour of small quantities of coffee (up to three cups approximately), while with a duration of a heating cycle of 12 seconds good results will be obtained for larger quantities of coffee.

When further developing the continuous flow heater, it will be excellently suited not only for keeping warm but also for making small quantities of infusion beverages, in particular coffee. This is because interrupting the brewing process after preferably 60 seconds allows the ground coffee to swell properly after its first contact with hot water before further water is applied to it. Such swelling improves the flavour of an infusion beverage, in particular if it is coffee. A like 'brewing pause' is dispensable with larger quantities of infusion beverages because due to the relatively large supply of cold water, for instance, the coffee powder has sufficient time to swell-even if the brewing process is not interrupted.

The use of an electromagnetic relay to control the heating element during the keep-warm process provides an extremely fail-safe manner, what does not apply to the previously known continuous flow heaters on account of the thermostats which are afflicted by mechanical fatigue.

An NTC resistor is suitable as an insusceptible and inexpensive design form of a temperature sensor which, in addition, inheres a by far sufficient susceptibility of its resistance in response to temperature.

When a voltage is derived from the temperature-responsive resistance of the NTC resistor which is compared with a reference voltage in a comparator in the control circuit, and when in addition the control circuit comprises a microcontroller which checks this comparison and all other logical linkings, an exact and quick actuation of the switching element will result. An extremely reliable operation of the continuous flow heater in the keep-warm process will be achieved in a rather low-cost way, given the nowadays considerably cheaper prices for such microcontrollers.

Improving upon the continuous flow heater inheres the advantage that the keep-warm process is discontinued and hence also the apparatus for making infusion beverages is set out of operation once it has to be assumed that its user has forgotten to disconnect it manually. When the maximally intended duration of the keep-warm process is adjustable within correspondingly wide ranges, it may hardly occur that the apparatus containing in the storage tank an infusion beverage that is still to be kept warm will be set out of function prematurely contrary to the user's actual intention.

When further developing the continuous flow heater, a good heat contact between the NTC resister and the infusion beverage inside the storage tank enables possibly occurring temperature variations thereof be rapidly and directly have an effect also as temperature variations of the NTC resistor, in consequence whereof the time delay between a variation in the temperature of the infusion beverage to be controlled and the corresponding variation in the temperature of the NTC resistor can be kept quite short. The simple mechanical coupling of the metallic member to the storage tank will cause only minor constructive changes in the already known warming plates, and no such demands will be placed on the storage tank itself, what offers major advantages when starting series production of the continuous flow heater according to this invention.

In a particular continuous flow heater embodiment, the control circuit automatically interrupts the keep-warm process in the event that the storage tank is empty or is not placed on the warming plate. On the one hand, current is economized this way when the user has forgotten to switch off the infusion beverage maker after the storage tank has been emptied or removed from the warming plate for a longer period of time. On the other hand, it is achieved by this embodiment of the invention that apart from the controller switch and a temperature safety control which can be performed also for both voltage poles, another safety element for the prevention of fires is provided, even more so as such fires of beverage makers with continuous flow heaters of more than 1000 watt electric capacity are a real and imminent risk.

In a continuous flow heater embodiment, a rubber or elastic plastic element permits in a simple and low-cost fashion to obtain both the necessary residual thermal coupling between warming plate and NTC resistor and a safe mounting support for the movable metallic element. Besides, the anyway inexpensive elastic element can still be used to seal the base of the beverage maker disposed beneath the warming plate.

An improvement of the continuous flow heater inheres the advantage that owing to the heat-conduction paste a large-surface heat contact surface on the metallic sleeve is obtained so that the temperature sensor responds already to minor temperature variations.

In the particular continuous flow heater embodiment, in the absence of a storage tank on the warming plate, that is when the temperature sensor has moved out of the housing of the infusion beverage maker to assume its initial position, and when the infusion beverage maker has not yet been switched on, the continuous flow heater will not be put into operation, not even by actuating the main switch of the beverage maker. This is attained by the open position of the switch and the resulting off-signal in the microcontroller, in consequence whereof the microcontroller does not allow switching on of the infusion beverage maker.

On the other hand, when the storage tank is removed from the warming plate during the brewing process, in this event, too, displacement of the temperature sensor causes disconnection of the switch, and a signal is supplied to the microcontroller which is processed to such end that the continuous flow heater will be switched off although the main switch is still turned on. As soon as the storage tank is put on the warming plate again, the short-circuiting of the switch causes said to supply a signal to the microcontroller which latter will then switch on the continuous flow heater again, whereupon the brewing process is continued.

If, however, the infusion beverage maker is already in the keep-warm process, removing the storage tank from the warming plate also causes opening by the axial displacement of the temperature sensor, and the signal is supplied to the microcontroller which then will furnish the continuous flow heater with electrical energy, e.g. for 10 minutes still, by way of a circuit arrangement provided in the microcontroller. Unless the storage tank is put on the warming plate during this time, the microcontroller will initiate the switching off of the infusion beverage maker.

Once the storage tank is placed on the warming plate again before this keep-warm time elapses, the continuous flow heater remains switched on and is temperature-controlled by the thermostat. The last-mentioned control is produced in the keep-warm process operates independently of the apparatus described so that, if due to the residual coupling the temperature sensor responds sooner than before the wailing time of 10 minutes has elapsed, it will cause switching off of the continuous flow heater.

BRIEF DESCRIPTION OF THE DRAWINGS

An embodiment of the invention will be described in more detail hereinbelow with reference to the accompanying drawings. In the drawings.

DESCRIPTION OF PARTICULAR EMBODIMENT

Figure 1:
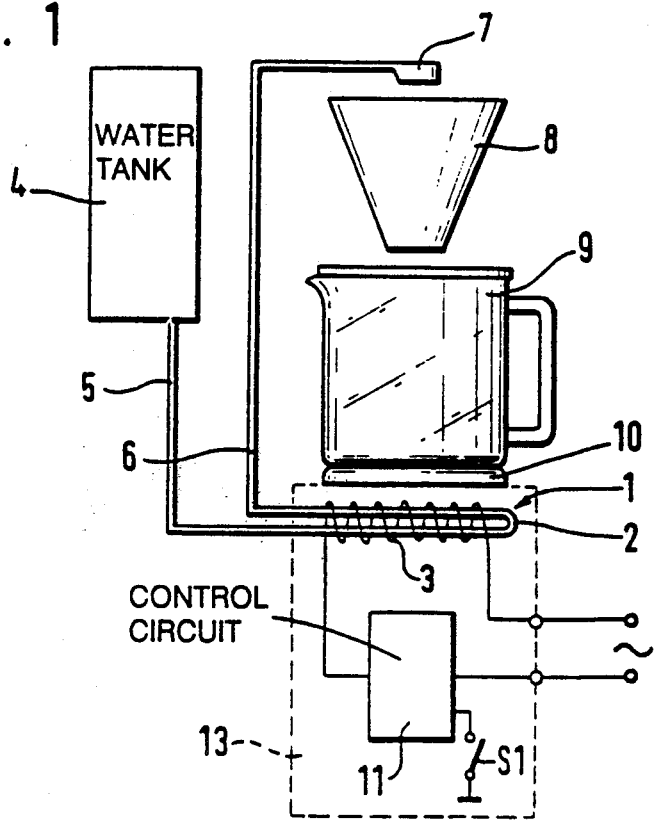
FIG. 1 is a schematic view of an apparatus for making infusion beverages equipped with an inventive continuous flow heater.

FIG. 1 shows in a schematic manner the structure of an apparatus for making infusion beverages on which the inventive continuous flow heater can be used which, in whole, is designated by reference numeral 1. Its most essential component parts are a water pipe 2 and an electric heating element 3 heating the water pipe 2. To make an infusion beverage cold water out of a supply tank 4 is conveyed to the continuous flow heater 1 through a supply conduit 5 and, after heated by the electric heating element 3, under the effect of the steam pressure caused thereby is conducted pulsatingly to a brewing unit 8 through a riser tube 6 and a so-termed brewing tip 7. The supply conduit 5 contains a non-illustrated non-return valve which ensures that cold water out of the supply tank 4 may principally enter the water pipe 2, yet that heated water as a result of the developing steam pressure may no more be transported in the direction of the supply tank 4, but exclusively to the brewing tip 7.

Either coffee or tea or any other ingredient for making a corresponding infusion beverage can be found in the interior of the funnel-shaped brewing unit 8. In the course of making the respective infusion beverage, it will descend into a storage tank 9 which, in turn, stands on a warming plate 10. Said warming plate 10 is likewise heated by the continuous flow heater 1 so that the flow heater's electric heating element 3 heats the water pipe 2 one hand, and the warming plate 10, on the other hand.

In the so-called brewing process, that means during the time in which cold water is constantly delivered from the supply tank 4 into the water pipe 2, the heating of the water pipe 2 is predominant, and the heating capacity of the electric heating element 3 which may amount to 1000 watts or more is conformed to this need. On the other hand, the heating capacity of the electric heating element 3 is much too great during the so-called keep-warm process, that means upon completion of the brewing process, since heating capacities of considerably less than 100 watts are required only to keep the infusion beverage warm, depending on the heat insulation of the storage tank 9. Therefore, the electric heating element 3 may be set to function for only a relatively short time in the keep-warm process—other than during the brewing process—and subsequently must be deactivated again for a longer period of time. The control circuit 11 required therefor which, among others, comprises a thermostat 12 thermally coupled to the continuous Flow heater 1 (see FIGS. 2 and 3) is activated by closing of a switch S1 which controls the mains voltage supply. The schematic design of the control circuit 11 and its mode of function will be explained in the description of FIGS. 4 to 5.

Both the control circuit 11 and the warming plate 10 are mounted in the base 13 of the infusion beverage maker, shown only schematically in dotted lines, while the largest part of the warming plate 10 is free though, in order to establish a good heat contact with the storage tank 9.

Figure 2:
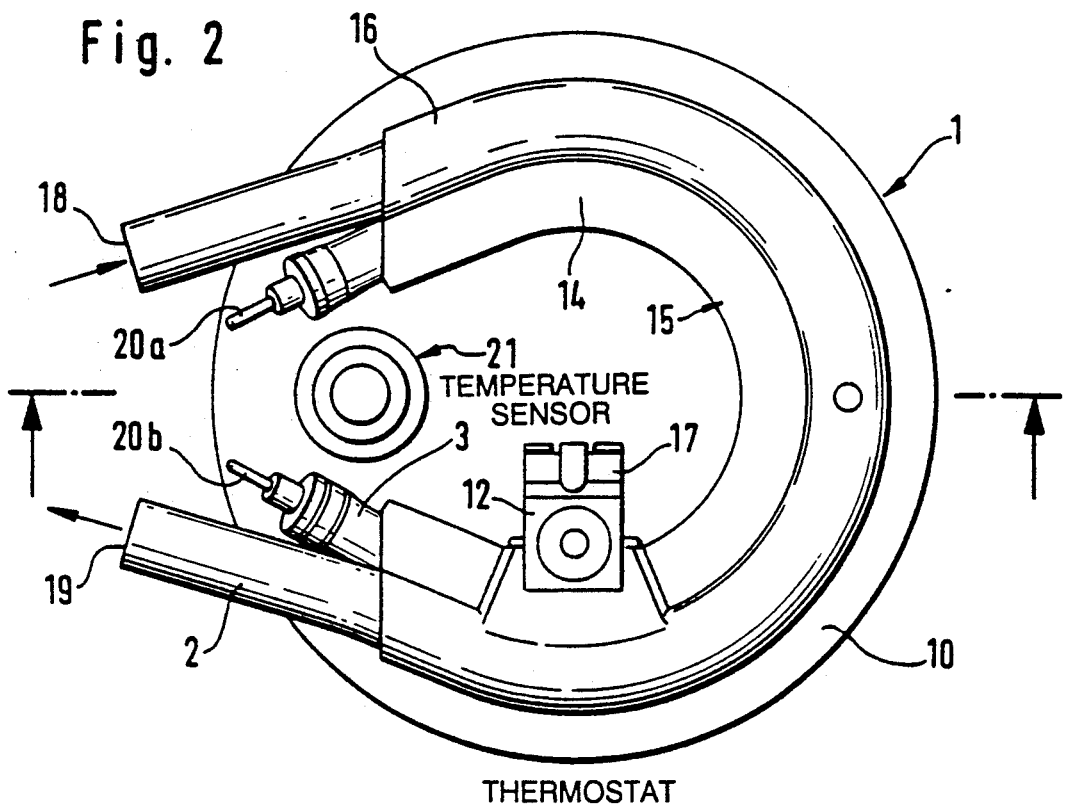
FIG. 2 is a bottom view of the continuous flow heater of FIG. 1.

FIG. 2 illustrates the most important component parts of the continuous flow heater 1 once more in detail. Both the water pipe 2 and the electric heating element 3 extending in parallel thereto have a horse-shoe shaped configuration and are interconnected almost over their entire course via a rib 14 providing good heat conductivity (see FIG. 3), on the one hand. On the other hand, further mechanical and thermal connection between the water pipe 2 and the electric heating element 3 is established by a continuous metal sheet 15, the said sheet 15 for further improving the thermal and mechanical connection being beaded at its two rims 16 such that it outwardly embraces the water pipe 2. A lug 17 is shaped from the metal sheet 15 with which the thermostat 12 is in good thermal contact and also in mechanical connection.

The inlet opening 18 of the water pipe 2 connects to the supply conduit 5, while its outlet opening 19 connects to the riser tube 6, the direction of water flow through the continuous flow heater 1 being marked once more by arrows placed in the vicinity of the two openings 18, 19. Finally, the electric heating element 3 is furnished with electric connections 20a and 20b which are connected to the mains voltage by the control circuit 11 once the beverage maker is put into operation.

A temperature sensor which, in whole, has been referred to by reference numeral 21 can still be gathered in a schematic fashion, and it extends through the warming plate 10 in the direction of the storage tank 9 and its mechanical structure will be described in more detail in the description of FIG. 5. The temperature sensor 21 is arranged in that area of the horse-shoe shaped continuous flow heater 1 in which the warming plate 10 has no more direct thermal contact with the electric heating element 3. In addition, the temperature sensor 21 is in good thermal contact with the storage tank 9, while it has only minor residual thermal coupling to the warming plate 10. The realisation of these two different heat engineering requirements will be explained in the description of FIG. 5.

Figure 3:
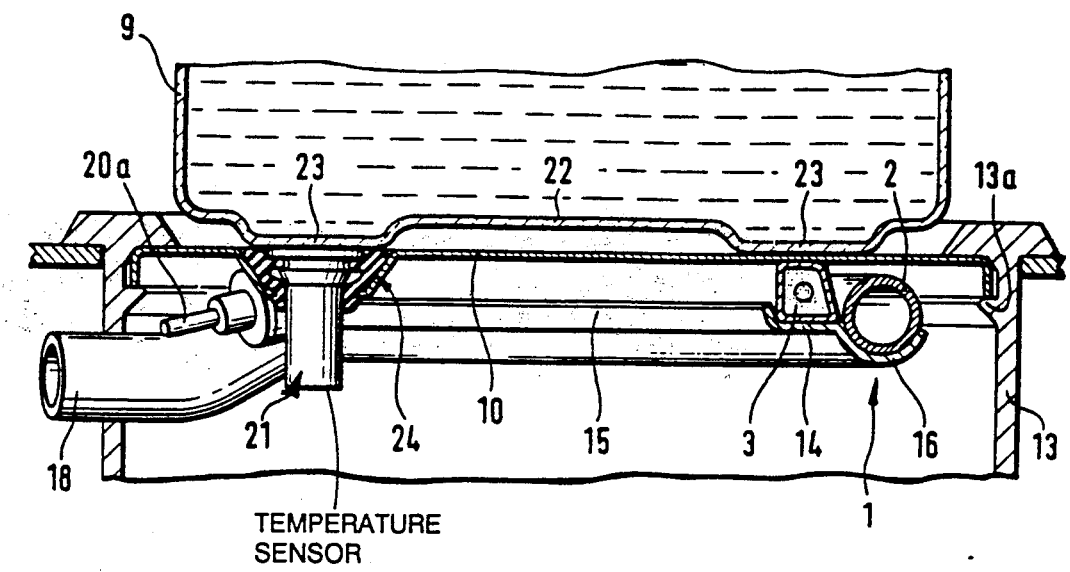
FIG. 3 is a cross-section taken through the continuous flow heater according to FIG. 2 with a storage tank placed thereon together with its mounting support in the base of the beverage maker, however turned by 180° in the drawing plane.

According to FIG. 3, the warming plate 10 at its rim is coupled to the base 13 of the apparatus for making infusion beverages, which coupling can be brought about by means of snap-type elements 13a. Since the warming plate 10 is connected to the electric heating element 3 and the latter, in turn, connects via the rib 14 and the metal sheet 15 to the water pipe 2, also the entire continuous flow heater 1 is retained in the base 13 by the coupling means 13a. The cylinder-shaped storage tank 9 made from glass in placed on the warming plate 10, its bottom including an indentation 22 whereby, together with its shaping at the rim of the bottom, a circular abutment surface 23 for the storage tank 9 on the warming plate 10 is obtained. The position of the abutment surface 23 is chosen such that it follows the shape of the electric heating element 3 over wide areas. Merely in the open area between the electric connections 20a and 20b of the electric heating element 3 in which the temperature sensor 21 is placed the spatial course of the abutment surface 23 and that of the electric heating element 3 are not congruent, the said open area being due to the horse-shoe shaped configuration of the continuous flow heater 1. It is rather the temperature sensor 21 which contacts the abutment surface 23 here, the said sensor extending from below through the warming plate 10 (see FIG. 5) and being supported therein in a retaining element 24 which is illustrated but schematically in FIG. 3.

It is ensured this way that, on the one hand, heat emanating from the electric heating element 3 is conducted via the warming plate 10 directly into the storage tank 9 containing an infusion beverage, while, on the other hand, the temperature sensor 21 through the abutment surface 23 is likewise in good heat contact with the infusion beverage. As will be referred to in greater detail still by way of the description of FIG. 5, the heat coupling between the temperature sensor 21 and the warming plate 10 is considerably less than that between the temperature sensor 21 and the abutment surface 23.

Figure 4:
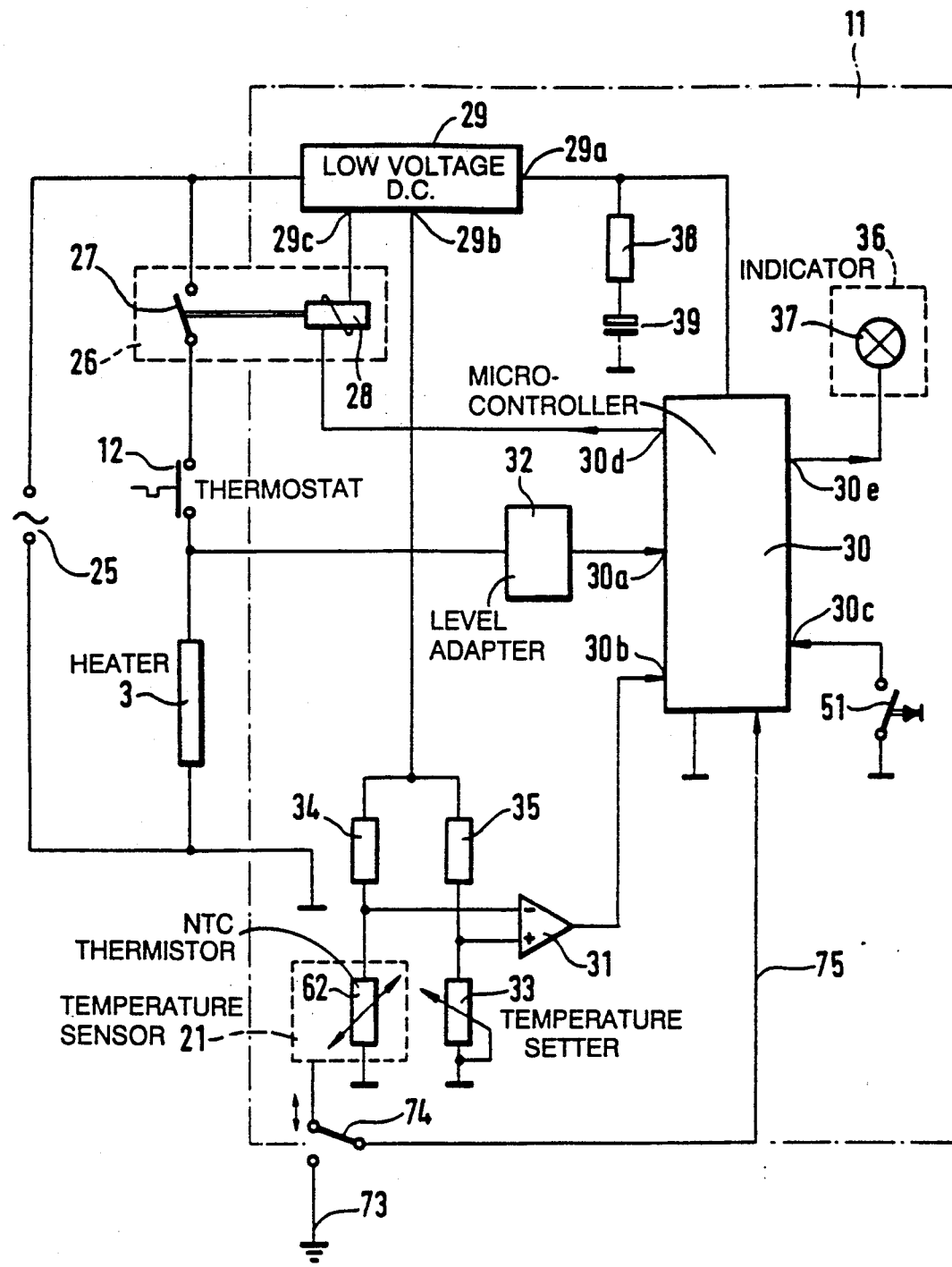
FIG. 4 is a wiring diagram of the electric control circuit controlling the heating element of the continuous flow heater.

The wiring diagram discernible from FIG. 4 shows as essential construction elements first of all an alternating voltage source 25, the electric heating element 3 in series arrangement in the circuit thereof, the thermostat 12 and a switching element 26 which is designed as an electromagnetic relay and is composed substantially of a switch 27 having two switch positions and an electromagnet 28 closing the latter switch, with the switch 27 remaining in its opened position when the electromagnet 28 is not activated. Connected in parallel to the mentioned series arrangement is a unit 29 for generating a direct-current low voltage which serves for the voltage supply (output 29a) of a microcontroller 30 and, on the other hand, (output 29b) for the voltage supply of a circuit configuration comprising comparator 31, and finally also for the voltage supply (output 29c) of the electromagnet 28.

As to the microcontroller 30, FIG. 4 depicts thereof but the three inputs 30a, 30b and 30c and the two outputs 30d and 30e. The input 30a receives the signal which is attenuated by a level-adapting unit 32 and indicates the condition of the thermostat 12 (effect as an open or closed electric switch). The input 30b receives the signal issued by the comparator 31, the level of which depends on the temperature of the temperature sensor 21 comprising an NTC resistor 62 and on the values adjusted by the user on a setting means 33, said input usually being connected with resistors 34 and 35. The input 30c of the microcontroller 30 is connected with a switch S1, by means of which the apparatus for making infusion beverages can be put into operation.

The output 30d of the microcontroller 30 drives the electromagnet 28 of the electromagnetic relay 26 and thereby governs the closing and opening of the switch 27. The output 30e finally actuates a display element 37 fitted on a display unit 36, and it is merely vicarious for a plurality of outputs of this type which drive still further non-illustrated display elements which are mounted on the display unit 36, too.

Arranged in parallel to the voltage supply of the microcontroller 30, an electrolytic capacitor 39 is kept in a constantly charged state via a resistor 38. The electrolytic capacitor 39 serves the purpose of a buffer for the voltage supply of the microcontroller 30 in the case that the apparatus for making infusion beverages should be disconnected from the mains supply temporarily or in case a short-time circuit failure occurs.

Figure 5:
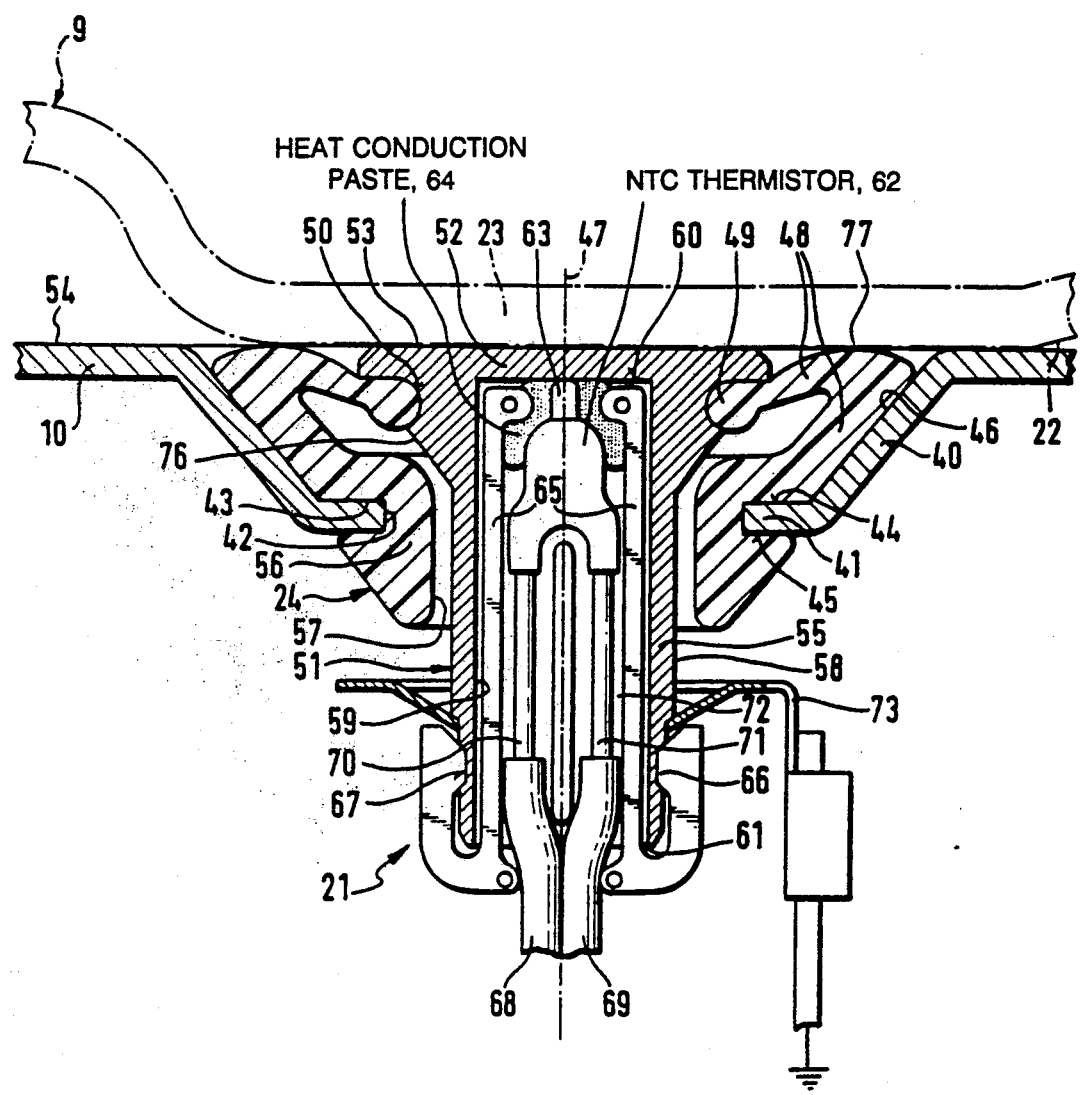
FIG. 5 is a longitudinal cross-section taken through the temperature sensor according to FIG. 3.

FIG. 5 shows a longitudinal cross-section through the temperature sensor 21 in the area of its attachment to the warming plate 10, wherein it is disposed in its position pressed downwards in the drawing by the abutment surface 23 of the storage tank 9. The warming plate 10 which is punched out of steel sheet and which, preferably, is deepdrawn comprises as an indentation a truncated-cone shaped portion 40 extending downwardly in the drawing, tapering downwardly and ending at an annular collar 41. The annular collar 41 forms an opening 42 into which a retaining element 24 provided with an annular groove 43 is buttoned in such a fashion that the frontal annular surfaces 44, 45 engage the annular collar 41 from behind, whereby the retaining element 24 is held stationarily in the opening 42.

The retaining element 24 is formed by a rubber element or by any temperature-resistent plastic material, e.g. Silicon or Teflon. The retaining element 24 in FIG. 5 extends upwardly along the inner wall 46 of the truncated-cone shaped portion 40 and, at the level of the warming plate 10, is bent towards the middle 47 in such a manner that its upper edge 77 will not project from the upper side 54 of the warming plate 10 in this position. The end portion 48 of the retaining element 24 performs the function of a bellows. The angled-off end of said bellows 48 is formed by an annular bead 49 which, under radial bias, is engaged into an annular groove 50 provided on the bowl-shaped sleeve 51. Preferably, aluminum was chosen as material for the sleeve 51 in order to attain a good heat conduction.

As can be clearly seen from FIG. 5, the temperature sensor 21 with the sleeve 51 is carried by the retaining element 24 and, in the position illustrated in FIG. 5, is urged by a clamping force against the abutment surface 23 of the storage tank 9 in order to produce a good heat transition from the abutment surface 23 of the storage tank 9 to the temperature sensor 21. In order that the sleeve 51 is pressed against the abutment surface 23 by a predetermined clamping force, the bellows 48 exerts an upwardly directed clamping force on the sleeve 51 according to FIG. 5. Said clamping force is achieved by the bending deformation resulting in the bellows 48 when the temperature sensor 21 is pressed downwards. This is because when the storage tank 9 is removed from the warming plate 10, the bending stress stored in the bellows 48 will cause the temperature sensor 21 to move upwardly, as viewed in the drawing, as far as until the bending stress in the bellows 48 has reduced to such extent that the own weight of the temperature sensor corresponds to this residual stress.

In the initial condition of the retaining element 24, the annular bead and the adjoining bellows portion are directed upwardly in the drawing according to FIG. 5, and the retaining element 24 adopts almost that shape which it had after is forming during manufacture. That is, in the absence of pressure directed downwards in the drawing on the bottom area 52 of the sleeve 51, the abutment surface 53 which can be moved into contact with the abutment surface 23 of the storage tank 9 projects from the upper side 54 of the warming plate 10, what is not discernible in FIG. 5 though, since herein the abutment surface of the storage tank 9 presses the temperature sensor 29 downwardly in opposition to the bending force produced in the bellows 48 by the deformation.

At the point where the annular groove 50 is designed on the sleeve 51, the sleeve 51 tapers conically downwardly in its outward peripheral area according to FIG. 5, adjacent whereto is a tubular portion 55. The annular portion 56 formed by the outward annular groove 43 contains a through-bore 57 which extends concentrically to the temperature sensor 21 and is spaced a small distance from the peripheral surface 58 of the tubular portion 55 of sleeve 51 to ensure that the sleeve 51 is axially slidable in the retaining element 54 devoid of friction. This is favourable since the bending forces developing in the bellows 48 as it deforms and permitting an axial displacement of the bellows 48 alongside the middle 47 are comparatively small. In any case the clamping force produced on deformation of the bellows 48 should not exceed the weight the storage tank 9 has in the absence of liquid stored therein. However, this clamping force must always be of such an amount that, as soon as the storage tank 9 is removed from the warming plate 10, the temperature sensor 21 in FIG. 5 is moved upwardly and its abutment surface 53 is projecting in relation to the upper side 54 of the warming plate.

The sleeve 51 in FIG. 5 comprises a blind-end bore 59 whose horizontally extending bottom 60 is designed in the bottom area 52, that means close to the abutment surface 53. A temperature-sensitive element 62 designed as an NTC resistor is slid so far into the open end 61 of the blind-end bore 59 arranged beneath the annular portion 56 of the retaining element 24 that its peg 63 projecting at the tip abuts on the bottom 60 and thereby establishes a good heat transmission from the bottom area 42 to the NTC resistor 62.

A heat-conduction paste 64 which is in good heat contact with the bottom 60 and the NTC resistor is applied in FIG. 5 on the temperature-sensitive area, that is around the peg 63, on the surface of the NTC resistor 62. Owing to the large-surface contact, the temperature-sensitive element 62 responds particularly quickly to temperature variations.

Fitted to the heat-conduction paste 64 in FIG. 5 are retaining arms 65 which extend along the blind-end bore 59 and which, at their open end 61, encompass the tubular portion 55 of the sleeve 51 so that the snap-type elements 66 shaped on them engage resiliently into indentations 67 designed in the peripheral surface 58 of the tubular portion 55. The temperature-sensitive element 62 is thereby kept reliably in abutment on the bottom 60 in the blind-end bore 59, as is shown clearly in FIG. 5.

The NTC resistor 62 connects via two lines 70, 71 to the circuit illustrated in FIG. 4 wherein the line 70 is grounded, For instance, while line 71 is connected to the negative input of the comparator 31 (FIG. 4). At the output of the lines 70, 71, insulation 68, 69 is furnished so that dirt and humidity may not enter into the chamber 72 formed by the blind-end bore 59. Further, the tubular portion 55 of the sleeve 51 has a ground connection 73 in order not to expose a user to the voltage in case he/she happens to touch the abutment surface 53 of the temperature sensor 21.

The mode of function of the control circuit 11 is as follows:

After the infusion beverage maker has been put into operation by closing of the switch S1, the microcontroller 30 through its output 30d keeps the electromagnetic relay 26 closed. Since the thermostat 12, too, acts as a closed electric switch due to the still cold continuous flow heater 1, the electric heating element 3 heats the water pipe 2, and the apparatus for making infusion beverages is in the brewing process. The microcontroller 30 monitors at its input 30a the signal which is responsive to the condition of the thermostat 12 and is transformed by means of the level-adapting unit 32. In case that the thermostat 12 remained opened for the first time for at least 40 seconds, the brewing process is regarded as completed, and transition to the keep-warm process is performed.

Should open switch positions of the thermostat 12 have occurred at least two times during the brewing process, and should they have lasted less than 40 seconds but at least 10 to 20 seconds, the microcontroller 30 will continue to control the heating element 3 in the brewing process, yet will issue a signal at its output 30e which activates the display element 37 in order to indicate a calcification of the water pipe 2 which caused the temporary opening of the thermostat 12. The display element 37 remains activated even in the case that the microcontroller 30 has finally recognized the end of the brewing process after the thermostat was opened for longer than 40 seconds and that from this moment on it controls the heating element 3 in the keep-warm process.

During the keep-warm process the thermostat 12 which acts as a closed electric switch again after corresponding cooling off of the heating element 3 will always remain in this condition. Therefore, the control of the electric heating element 3 is performed by the electromagnetic relay 26 alone, and that is to say in the following manner:

Once the user has adjusted on the setting means 33 a switching temperature ranging between 65° C. and 85° C. for instance as a desired temperature for the beverage to be kept warm, the temperature sensor 21 furnished with an NTC resistor 62 supplies a voltage to the comparator 31 which ensures that a signal is applied to the output of the comparator 31 and thus to the input 30b of the microcontroller 30 only for temperatures of the infusion beverage less than, or equal to, the switching temperature. When a like signal is applied, the microcontroller 30 via its output 30d and the electromagnet 28 will close the switch 27 for an interval of 10 or 12 seconds, and both values can be adjusted on the microcontroller 30 by way of switching means not shown. The lower value of 10 seconds for the duration of a heating cycle is chosen when it is desired to keep warm small quantities of a beverage. The greater value of 12 seconds is meant for keeping warm larger quantities (in general more than 3 cups). Irrespective of the actual temperature of the temperature sensor 21, the microcontroller 30 deactivates the electromagnetic relay 26, and hence also the electric heating element 30, for a dead time of roughly 90 seconds.

When the dead time has elapsed, it depends on the sensor temperature measured by the temperature sensor 21 whether a new heating cycle is performed at once, or whether it will be effected but later. This is because a new heating cycle will be performed only if the sensor temperature is below or equal to the adjusted switching temperature.

It is marginal condition at the commencement of the control of the electric heating element 3 that, in the event that the sensor temperature found by the temperature sensor 21 at the commencement of the keep-warm process is in excess of the adjusted switching temperature, the electromagnetic relay 26 will be kept in its opened position for as long as the sensor temperature remains in excess of the switching temperature in the course of the consequently occurring cooling of the infusion beverage.

When the capacity of the continuous flow heater (1000 watts is suitably conformed to the opening temperature (herein 155° C.) and the closing temperature (herein 140° C.) of the thermostat 12, the chosen dead time of 90 seconds and the duration of the heating cycle of 10 or 12 seconds, it is always safeguarded that the temperature of the thermostat 12 in the keep-warm process constantly remains below the opening temperature.

The microcontroller 30 can perform still further tasks apart from the control of the electric heating element 3. Thus, the microcontroller 30 interrupts the brewing process after 60 seconds when the short heating cycle of 10 seconds has been chosen, and it will re-assume it until the end after a "brewing pause" of 30 seconds.

Furthermore, when the short heating cycle of 10 seconds has been chosen, the microcontroller 30 will trigger another display element not shown approximately 50 seconds after the termination of the brewing process, while this will not take place until after roughly 80 seconds when the longer heating cycle of 12 seconds has been chosen. The value of 50 or 80 seconds, respectively, corresponds to the so-termed "dripping time" for small and large quantities of infusion beverages, respectively, that means the time interval after the completion of the brewing process, upon lapse of which no appreciable portion of the infusion beverage will discharge any more from the brewing unit 8 into the storage tank 9 and the infusion beverage can thus be regarded as being ready.

The microcontroller 30 can be programmed also as a timer so that the apparatus for making infusion beverages can be put into operation even automatically without closing of the switch S1.

Eventually, it has to be stated that the microcontroller 30 will finally interrupt the keep-warm process after a time interval which can likewise be programmed by the user in that it keeps the switch 27 of the electromagnetic relay 26 permanently open. Switch 27 will then be closed again only when a new brewing process is initiated.

It is the purpose of the switch 74 in FIG. 4 that, in the event that no storage tank 9 is placed on the warming plate 10, in consequence whereof the temperature sensor 21 has moved out of the housing 10 of the infusion beverage maker to assume its initial position (not shown in FIG. 5), and in the event that the infusion beverage maker has still not been switched on, the continuous flow heater 1 will not be set to operate, not even by turning on the main switch at 25, FIG. 4, of the infusion beverage maker. This is achieved by the open position of the switch 74 and by the off-signal thereby produced in the microcontroller 30 so that the microcontroller 30 will not permit turning on of the infusion beverage maker.

If, on the contrary, the storage tank 9 is removed from the warming plate 10 during the brewing process, in this case, too, the switch 74 is interrupted by displacement of the temperature sensor 21, and a signal is supplied to the microcontroller 30 which processes the latter such that the continuous flow heater 1 is switched off although the main switch (at 25 in FIG. 4) is still turned on. As soon as the storage tank 9 is placed again on the warming plate 10 (FIG. 5), shortcircuiting of the switch 74 in FIG. 4 will cause delivery of a signal to the microcontroller 30 which latter switches on the continuous flow heater 1 again, and the brewing process is continued.

However, if the infusion beverage maker is already in the keep-warm process when the storage tank 9 is removed from the warming plate 10, the axial displacement of the temperature sensor 21 will likewise cause the switch 74 to open, and the signal is delivered to the microcontroller 30 which will then continue to supply the continuous flow heater with electrical energy, for instance for 10 minutes still, by virtue of a circuit configuration provided in the microcontroller 30. When the storage tank 9 is not placed on the warming plate 10 during this period of time, the microcontroller 30 will initiate switching off of the infusion beverage maker.

If the storage tank 9 is restored on the warming plate 10 before this keep-warm time elapses, the continuous flow heater 1 remains switched on further, and its temperature is controlled by the thermostat 12. The control mentioned the last which results in the keep-warm process operates independently of the residual coupling, as described before, so that if, due to the residual coupling, the temperature sensor 21 reacts in a shorter time, that is before the waiting time of 10 minutes has elapsed, it will cause switching off of the continuous flow heater 1.

I claim:

1. A continuous flow heater for an apparatus for making infusion beverages comprising a water pipe and an electrically operated heating element which simultaneously heats a warming plate and the water pipe, the brewing process taking place in that cold water out of a supply tank flows via an inlet opening into the water pipe, is heated there and is supplied by vapour pressure through an outlet opening to a brewing unit to perform a brewing process, from which the infusion beverage exits into a storage tank in which, upon completion of the brewing process, the beverage is further kept warm by the warming plate in a temperature-controlled fashion during a keep-warm process, comprising a thermostat which is electrically connected in series with the heating element and is in good thermal contact with the continuous flow heater, the said thermostat remaining always closed during the brewing process even if the water pipe is moderately calcified and reaching its opening temperature only upon completion of the brewing process whereupon it acts as an opened electric switch, while after its consequently occurring cooling to its closing temperature it acts as a closed electric switch again, whereby the commencement of the keep-warm process is determined, characterised in that, in electric series connection to the thermostat (12), another electric switching element (26), having an open and a closed position is connected which is always closed in the brewing process and can be opened and closed again in the keep-warm process by a control circuit (11) which, in turn, comprises a temperature sensor (21) which is in good heat contact with the storage tank containing the infusion beverage, in that in the event that at the commencement of the keep-warm process the sensor temperature is in excess of a predefinable switching temperature, the control circuit (11) keeps the switching element (26) in its open position for as long as the sensor temperature in the course of the consequently occurring cooling of the infusion beverage remains in excess of the switching temperature, in that in the event that the sensor temperature is less than or equal to the switching temperature of the switching element (26), the control circuit (11) in the keep-warm process always keeps the switching element (26) in its closed position for a predefinable first length of time defining a heating cycle irrespective of the sensor temperatures occurring during the heating cycle, the said heating cycle being timed so short that the temperature of the thermostat (12) always remains below its opening temperature, and in that upon completion of a heating cycle the control circuit (11) opens the switching element (26) and keeps it open for a predefinable dead time irrespective of the temperature measured by the temperature sensor (21) after the end of the heating cycle.

2. A continuous flow heater as claimed in claim 1, characterised in that the end of the brewing process is recognized by the control circuit (11) in that, after the beverage maker has been put into operation, the thermostat (12) acts as an opened electric switch for the first time at least for a predefinable second length of time.

3. A continuous flow heater as claimed in claim 2, wherein the control circuit (11) actuates a display element (37) indicating the increasing calcification of the water pipe (2) in the event that, upon the start of operation of the beverage maker, the thermostat (12) acts as an opened electric switch during the brewing process at least two times for a likewise predefinable third length of time which is shorter than the predefinable second length of time.

4. A continuous flow heater as claimed in claim 2, characterised in that with a heating capacity of the continuous flow heater (1) of 1000 watts, said thermostat (12) has an opening temperature of roughly 155° C. and a closing temperature of roughly 140° C., in that two alternate values can be adjusted on the control circuit (11) for the duration of a heating cycle, and in that a length of time of roughly 90 seconds is chosen for the dead time.

5. A continuous flow heater as claimed in claim 5, characterised in that, when the lower value has been chosen for the heating cycle, the control circuit (11) controls the brewing process in such a manner that the brewing action is interrupted once after a predetermined length of time.

6. A continuous flow heater as claimed in claim 1, characterised in that the switching temperature which is relevant for the control circuit (11) is adjustable.

7. A continuous flow heater as claimed in claim 1, characterised in that the switching element (26) is an electromagnetic relay.

8. A continuous flow heater as claimed in claim 11 characterised in that the temperature sensor (21) comprises an NTC resistor (62).

9. A continuous flow heater as claimed in claim 8, characterised in that in order to recognize whether the temperature of the NTC resistor (62) is still above the switching temperature, the control circuit (11) comprises a module unit by which a voltage depending on the resistance of the NTC resistor (62) is generated which is compared with a reference voltage in a comparator (31), in that the module unit comprises as a further essential component part a microcontroller (30) which examines the result of this comparison and, performs corresponding control functions.

10. A continuous flow heater as claimed in claim 9, characterised in that upon expiry of an operation time in the keep-warm process the microcontroller (30) discontinues said process by continuously keeping the switching element (26) in its open position irrespective of the instantaneous sensor temperature.

11. A continuous flow heater as claimed in claim 8, characterised in that the NTC resistor (62) is a movable temperature sensor (21) arranged in a metallic element (51) with which it is in good heat contact, in that said metallic element (51) in turn extends upwardly in a recess (40) of the warming plate (10) and can move downwardly in opposition to the effect of a clamping force, the magnitude of the clamping force and the weight of the storage tank (9) for the infusion beverage placed on the warming plate (10) being conformed to each other such that, on the one hand, the metallic element (51) bears against the abutment surface (23) of the storage tank (9) and hence there is a good heat contact between the storage tank (9,) and the metallic element (51), and that, on the other hand, the storage tank (9) is still in its position placed on the warming plate (10).

12. A continuous flow heater as claimed in claim 11, characterised in that there is a residual thermal coupling between the warming plate (10) and the temperature sensor (21) which is rated such that, on heating of the warming plate (10) with the storage tank (9) not standing on it or being empty, first the temperature sensor (21) falls short of its switching temperature before the thermostat (12) can reach its opening temperature, and in that the control circuit (11) discontinues the keep-warm process if the sensor temperature exceeds the switching temperature uninterruptedly for longer than a predefinable fourth length of time.

13. A continuous flow heater as claimed in claims 11 or 12, characterised in that the residual thermal coupling between temperature sensor (21) and warming plate (10) which is due to heat conduction is achieved by a retaining element (24) made of resilient material, which is incorporated in the warming plate (10), on the one hand, and which guides the movable temperature sensor (21), on the other hand.

14. A continuous flow heater as claimed in claim 11, characterised in that the metallic element (51) is composed of a sleeve (51) which is closed towards the bottom of the storage tank (9), in that the good heat contact between the sleeve (51) and the NTC resistor (62) is brought about by said sleeve being filled with a heat-conduction paste (64).

15. A continuous flow heater as claimed in claim 11, characterised in that the temperature sensor (21) is furnished with a switch (74) coupled to the microcontroller (30) via the line (75), and which upon displacing outwardly when the storage tank (9) is removed from the warming plate (10), opens the switch (74) and thereby delivers a signal to the microcontroller (30) which latter, in turn, disconnects the continuous flow heater (1).

* * * * *

UNITED STATES PATENT AND TRADEMARK OFFICE
CERTIFICATE OF CORRECTION

PATENT NO.   : 5,283,854
DATED        : February 1, 1994
INVENTOR(S)  : Heinz Schiebelhuth It is certified that error appears in the above-identified patent and that said Letters Patent is hereby corrected as shown below:

Col. 3, line 32, " 'excessive' rise " should be --'excessive rise'--.

Col. 3, line 59, after "for" insert --a--.

Col. 3, line 64, "Flow" should be --flow--.

Col. 4, lines 17-18, delete "affords the advantage that".

Col. 5, line 15, "be" should be --to--.

Col. 5, line 63, "not-be" should be --not be--.

Col. 7, line 37, "Flow" should be --flow--.

Col. 11, line 22, "For" should be --for--.

Col. 12, line 33, after "is" insert --a--.

Col. 15, claim 15, line 19, "11" should be --1--.

Signed and Sealed this

Fifth Day of July, 1994

*Attest:*

BRUCE LEHMAN

*Attesting Officer*    *Commissioner of Patents and Trademarks*